Patented Jan. 25, 1938

2,106,298

UNITED STATES PATENT OFFICE 2,106,298

TREATMENT OF MATERIALS

Henry Dreyfus, London, England

No Drawing. Application September 20, 1935, Serial No. 41,422. In Great Britain October 2, 1934

11 Claims. (Cl. 91—68)

This invention relates to the sizing or like treatment of filaments, threads, yarns or the like.

I have found that salts of ammonia or organic derivatives of ammonia (hereinafter referred to as nitrogenous bases) with carboxy substituted esters or ethers of cellulose are of particular value for the sizing of fibrous materials, particularly textile filaments, threads, yarns and the like, both in view of their lack of detrimental action on textile fibres and in view of the ease with which the size is removed, by mild scouring, from materials to which they have been applied.

According to the present invention, therefore, filaments, threads, yarns or the like are sized with ammonium salts of carboxy substituted esters or ethers of cellulose, that is, ammonium salts of cellulose esters or ethers of which esterifying acid radicles or etherifying radicles as the case may be, contain carboxyl groups. These cellulose esters or ethers are hereinafter referred to as "carboxyl-containing derivatives of cellulose". In place of the ammonium salts of these compounds salts of organic derivatives of ammonia may be employed.

Threads, for example warp threads, sized with any of these compounds resist very well such mechanical treatment as is experienced, for instance, in weaving. As has been indicated, moreover, the size can readily be removed by a mild scouring process.

The salts of the carboxy esters or ethers of cellulose employed may be obtained for example by the direct esterification or etherification of cellulose under suitable conditions, followed by reaction with ammonia or with the organic derivative of ammonia. For instance cellulose may be esterified, e. g. in the presence of chloracetic anhydride, with a di- or poly-carboxylic acid, for example oxalic or maleic acid, and the resultant esters containing carboxyl groups reacted with ammonia or the organic derivative of ammonia. Again, cellulose may be etherified with carboxy alkyl groups. Thus, alkali cellulose may be treated with chloracetic acid to produce cellulose derivatives, insoluble in water but yielding water-soluble ammonium salts and containing about 0.75 to 1.25 carboxy-methyl-ether groups per $C_6H_{10}O_5$ molecule. More highly etherified compounds may, however, be used, e. g. compounds containing 1½ or 2 or more carboxy-methyl-ether groups per $C_6H_{10}O_5$ molecule.

Amongst acids which may be employed in the production of the carboxy esters of cellulose there may be mentioned in addition to the oxalic and maleic acids referred to above, aromatic di- or poly-carboxylic acids such for example as phthalic acid, and aliphatic di- or poly-basic acids such for example as succinic, diglycolic, dilactic, dihydracrylic and thiodiglycolic acids. It will be appreciated that it is not essential for the cellulose to be esterified only with one of these acids; the ester may be a mixed ester of cellulose. Thus for example an ammonium cellulose acetate phthalate may be employed in accordance with the present invention.

The cellulose molecule present in the compounds is advantageously degraded. Thus the ester or ether may be one prepared from cellulose which has been degraded by means of alkalies or acids. Again the cellulose molecule may be degraded during or after esterification or etherification, e. g. during a ripening operation.

If desired other substituent groupings may be present in the cellulose ester or ether. Thus, for example, the cellulose ester or ether may contain acid radicles or etherifying radicles carrying hydroxy groups as well as carboxylic groupings.

The salts which are particularly useful for the purposes of the invention are those of ammonia itself and of the lower aliphatic amines, such as the methylamines, ethylamines and alkylolamines, e. g. mono-, di- and tri-ethanolamine. Salts of readily volatile amines, e. g. methylamine, like ammonia are of value in that the size coatings obtainable therewith tend to become less soluble on drying and so less affected by moisture. Such coatings are nevertheless readily removable by a weakly alkaline scour. It has further been found that the most satisfactory results are obtained when sizing with compounds which form aqueous solutions yielding films on evaporation of the aqueous media.

Solutions of the salts may be applied to yarns, filaments, threads or the like in any convenient manner. Thus, for example, the yarns or the like may be treated in hank form with the solutions or they may be passed continuously through the solutions and subsequently subjected to a drying operation. One application of the new process is to the sizing of artificial filaments, yarns or the like continuously with their production. Thus for example a solution of cellulose acetate in acetone may be spun into an evaporative atmosphere and the sizing solution applied continuously to the filaments as they leave the spinning apparatus and prior to their being wound or twisted and wound.

The salts may be applied as aqueous solutions of various strengths. Concentrations between 2 and 5% are usually satisfactory, though greater or less concentrations may be desirable according to the particular compound employed and the method of application utilized.

While the salts may be applied to filaments, threads, yarns or the like generally, whether natural or artificial, they are of particular value when used in the sizing of yarns or threads of artificial filaments, for example, filaments of regenerated cellulose as produced for instance by the viscose or cuprammonium processes, or filaments of organic derivatives of cellulose, e. g. cellulose acetate, formate, butyrate, propionate or other ester of cellulose or methyl, ethyl or benzyl cellulose or other cellulose ether. Thus, for example, they may be employed in the production of cellulose acetate crepe materials.

As mentioned previously the sizes applied to the textile materials in accordance with the invention are comparatively easily removed. For example, removal may be effected by scouring, e. g. in an aqueous soap solution. In some cases alkalies assist removal. Very small concentrations of alkali often have a beneficial effect in the removal of the size, a great advantage in the treatment of materials made of or containing cellulose ester or ether materials liable to damage by strong alkaline solutions.

The invention is illustrated but not limited by the following example.

*Example*

A cellulose carboxy-methyl-ether obtained by the action of 1 molecular proportion of sodium chloro-acetate upon 1 molecular proportion of soda cellulose, is made into a solution of 4% concentration with the requisite quantity of water and with ammonia in a small excess over that required to secure complete solution. Cellulose acetate thread is then sized by passing it through the above solution which is maintained at about 40–50° C. The thread is thereafter dried by passing it round a steam heated drying drum.

What I claim and desire to secure by Letters Patent is:—

1. A process of sizing textile yarn, which comprises impregnating the yarn with an aqueous solution of an ammonium salt of a carboxyl-containing derivative of cellulose, and thereafter drying the yarn.

2. A process of sizing textile yarn, which comprises impregnating the yarn with an aqueous solution of an ammonium salt of a carboxy-methyl-ether of cellulose, and thereafter drying it.

3. A process of sizing cellulose acetate yarn, which comprises impregnating the yarn with an aqueous solution of an ammonium salt of a carboxy-methyl-ether of cellulose, and thereafter drying it.

4. Textile yarn sized with an ammonium salt of a carboxy-methyl-ether of cellulose.

5. Cellulose acetate yarn sized with an ammonium salt of a carboxy-methyl-ether of cellulose.

6. The process of sizing fibrous materials which comprises applying thereto a salt of a carboxyl-containing derivative of cellulose with a nitrogenous base of the formula

where $R_1$, $R_2$ and $R_3$ each represent hydrogen or a monovalent aliphatic radicle.

7. The process of sizing textile yarns which comprises impregnating the yarn with an aqueous solution of a salt of a carboxyl-containing derivative of cellulose with a volatile nitrogenous base of the formula

where $R_1$, $R_2$ and $R_3$ each represent hydrogen or a monovalent lower aliphatic radicle, and thereafter drying the yarn.

8. The process of sizing cellulose acetate yarns which comprises impregnating the yarn with an aqueous solution of a salt of a carboxyl-containing derivative of cellulose with a nitrogenous base of the formula

where $R_1$, $R_2$ and $R_3$ each represent hydrogen or a monovalent lower aliphatic radicle, and thereafter drying the yarn.

9. Fibrous materials sized with a salt of a carboxyl-containing derivative of cellulose with a nitrogenous base of the formula

where $R_1$, $R_2$ and $R_3$ each represent hydrogen or a monovalent aliphatic radicle.

10. Textile yarns sized with a salt of a carboxyl-containing derivative of cellulose with a volatile nitrogenous base of the formula

where $R_1$, $R_2$ and $R_3$ each represent hydrogen or a monovalent lower aliphatic radicle.

11. Cellulose acetate yarns sized with a salt of a carboxyl-containing derivative of cellulose with a nitrogenous base of the formula

where $R_1$, $R_2$ and $R_3$ each represent hydrogen or a monovalent lower aliphatic radicle.

HENRY DREYFUS.

CERTIFICATE OF CORRECTION.

Patent No. 2,106,298. January 25, 1938.

HENRY DREYFUS.

It is hereby certified that error appears in the printed specification of the above numbered patent requiring correction as follows: Page 1, first column, line 51, for the word "or" first occurrence, read to; and that the said Letters Patent should be read with this correction therein that the same may conform to the record of the case in the Patent Office.

Signed and sealed this 8th day of March, A. D. 1938.

(Seal)

Henry Van Arsdale,
Acting Commissioner of Patents.